(12) United States Patent
Senturk et al.

(10) Patent No.: US 7,045,475 B2
(45) Date of Patent: May 16, 2006

(54) HIGH REFRACTIVE INDEX GLASS BEADS FOR HIGH RETROREFLECTIVITY SURFACES

(75) Inventors: Ufuk Senturk, Bridgeport, PA (US); Michael P. Lanci, Baltimore, MD (US); Raymond Jackson, Durham (GB); John W. Lau, Villanova, PA (US)

(73) Assignee: PQ Corporation, Berwyn, PA (US)

( * ) Notice: Subject to any disclaimer, the term of this patent is extended or adjusted under 35 U.S.C. 154(b) by 0 days.

(21) Appl. No.: 10/834,147

(22) Filed: Apr. 28, 2004

(65) Prior Publication Data

US 2005/0245642 A1 Nov. 3, 2005

(51) Int. Cl.
*C03C 12/00* (2006.01)
*C03C 3/078* (2006.01)
*C03C 3/089* (2006.01)

(52) U.S. Cl. ............................. 501/33; 501/34; 501/55; 501/65; 501/66; 501/67; 501/68; 501/69; 501/70; 501/72; 428/402

(58) Field of Classification Search ................ 501/33, 501/55, 65–70, 72, 34
See application file for complete search history.

(56) References Cited

U.S. PATENT DOCUMENTS

| | | | |
|---|---|---|---|
| 2,334,578 A | 11/1943 | Potters | |
| 2,610,922 A | 9/1952 | Beck | |
| 3,035,928 A | 5/1962 | Searight | |
| 3,193,401 A | 7/1965 | Alexander et al. | |
| 3,279,905 A | 10/1966 | Wood et al. | |
| 3,294,559 A | 12/1966 | Searight et al. | |
| 3,365,315 A | 1/1968 | Beck et al. | |
| 3,419,403 A | 12/1968 | Searight et al. | |
| 3,490,065 A | 1/1970 | Shannon et al. | |
| 3,495,961 A | 2/1970 | Lange | |
| 3,499,745 A | 3/1970 | Plumat | |
| 3,832,192 A | 8/1974 | McIntosh | |
| 3,946,130 A | 3/1976 | Tung et al. | |
| 3,960,579 A | 6/1976 | Broemer et al. | |
| 4,141,742 A | 2/1979 | Nakajima | |
| 4,367,919 A | 1/1983 | Tung et al. | |
| 4,444,893 A * | 4/1984 | Mader et al. | 501/72 |
| 4,451,542 A | 5/1984 | Ishida et al. | |
| 4,540,672 A * | 9/1985 | Boudot et al. | 501/65 |
| 4,812,423 A * | 3/1989 | Kodama et al. | 501/55 |
| 4,822,758 A * | 4/1989 | Boudot et al. | 501/65 |
| 5,017,521 A * | 5/1991 | Yale et al. | 501/64 |
| 5,286,682 A | 2/1994 | Jacobs et al. | |
| 5,292,690 A | 3/1994 | Kawachi et al. | |
| 5,411,922 A * | 5/1995 | Jones | 501/71 |
| 5,472,918 A * | 12/1995 | Onozawa | 501/65 |
| 5,521,128 A * | 5/1996 | Jones et al. | 501/27 |
| 5,674,616 A | 10/1997 | Balcar | |
| 5,716,706 A | 2/1998 | Morris | |
| 5,780,372 A * | 7/1998 | Higby | 501/70 |
| 5,843,855 A * | 12/1998 | Suha et al. | 501/67 |
| 5,843,856 A * | 12/1998 | Suha et al. | 501/67 |
| 5,853,851 A | 12/1998 | Morris | |
| 6,196,684 B1 * | 3/2001 | Comte et al. | 351/168 |
| 6,284,687 B1 | 9/2001 | Comte et al. | 501/75 |
| 6,412,957 B1 * | 7/2002 | Oba | 359/536 |
| 6,461,988 B1 | 10/2002 | Budd et al. | |
| 6,479,417 B1 | 11/2002 | Frey et al. | |
| 6,551,952 B1 * | 4/2003 | Wolff et al. | 501/68 |
| 2003/0203337 A1 | 10/2003 | Roulston et al. | |

FOREIGN PATENT DOCUMENTS

| | | |
|---|---|---|
| EP | 1 135 343 B1 | 7/2003 |
| JP | 62-292646 | 12/1987 |
| WO | WO-00/20345 | 4/2000 |

\* cited by examiner

*Primary Examiner*—H. Thi Le
(74) *Attorney, Agent, or Firm*—RatnerPrestia

(57) ABSTRACT

Glass formulations, and a method of converting such glass formulations to glass beads having a refractive index of at least 1.59 and a high level of retroreflectivity, are provided. The methods and formulations provide beads also having high levels of resistance to degradation by environmental exposure.

20 Claims, 1 Drawing Sheet

HIGH REFRACTIVE INDEX GLASS BEADS FOR HIGH RETROREFLECTIVITY SURFACES

FIELD OF THE INVENTION

This invention relates to glass beads. More particularly, it relates to a glass formulation and a process and apparatus for producing glass beads having a high level of retroreflectivity.

BACKGROUND OF THE INVENTION

There are many industrial and commercial uses for glass beads. For example, such beads have been used primarily to improve the reflectivity of a surface, such as on highway signs, in paint for pavement markings, on motion picture screens, and on advertising signs. Glass beads have also been used as fillers for thermoplastic and thermosetting resins. Other uses include the use of glass beads as the medium for grit blasting and for peening certain metals. Glass beads can also be used in reflective clothing, or they can be coated with metal and used as a conductive medium.

For many applications, a combination of properties is required for satisfactory performance. Typically, it is desired that the beads be as nearly spherical as possible, in order to provide optimal performance. Applications in which this is important include those in which reflectivity of the beads is crucial, for example in pavement marking, where the term "retroreflectivity" is used to describe the amount of light that reflects back in the direction of a source, typically headlights on a vehicle.

In pavement marking applications in particular, a number of other performance parameters are important as well, including resistance to degradation by the harsh mechanical and physical environment of a road surface. A high refractive index is needed for high retroreflectivity, but this is often at odds with one or both of the requirements for chemical and mechanical durability and the requirement for a high degree of sphericity. These properties are greatly influenced by the way in which the beads are made, by the particular glass formulations used in their preparation, and by interactions of these variables.

One method for forming highly spherical glass beads is disclosed in European patent EP 1,135,343B1 to Jackson et al., and employs either a rotating strike wheel or a jet of gas from a flame to break up a molten stream of glass into filaments. As these filaments pass through the heated region of the particular process, they form spheres. However, if the filaments do not reside in the heated region for a long enough time and/or at a high enough temperature, a high percentage of the filaments do not have time to form round beads. On the other hand, if the filaments reside in the heated zone for a period too long and/or at a temperature too high, then the beads tend to stick to one another and form satellite structures such as doublets or triplets, which are highly undesirable. According to the Jackson patent, the time and temperature conditions during which the filaments are maintained following their formation, prior to cooling and collecting the beads, are set according to an equation defining an optimal relaxation time during which a maximum percentage of the filaments reshape, or "spheridize", themselves to produce spherical beads. During the relaxation time, the beads are in free flight through a heated relaxation zone. The relaxation time depends upon the particle diameter, the viscosity of the glass during the relaxation process, and the surface tension of the glass during that process.

Nonetheless, with respect to beads for pavement marking, there still exits a need to identify glass formulations having a refractive index high enough for pavement marking beads, and yet also providing sufficient hardness, crush resistance, and stability to chemical attack to be durable in pavement marking, without being susceptible to bubble inclusion and/or at least partial devitrification of the beads. Thus, it is not always possible to find conditions suitable for the formation of highly spherical glass beads having low levels of devitrification and low levels of gas bubble inclusion from glass formulations having a high refractive index and capable of providing high resistance to degradation by environmental exposure. In sum, there remains a need for processes and glass compositions capable of providing glass beads with high retroreflectivity and good resistance to chemical and physical degradation.

SUMMARY OF THE INVENTION

In one aspect, the invention provides glass beads having a refractive index of at least 1.59 and having the following composition as stated in weight percent:

$SiO_2$=55–65
$R_2O$=10–20
RO=5–15
$RO_2$=10–25
$R_2O_3$=0–5
Other components 0–2 wherein $R_2O$ is an alkali metal oxide; RO is selected from the group consisting of alkaline earth metal oxides, ZnO, and combinations of these; $RO_2$ is $TiO_2$, $ZrO_2$, or a combination thereof; and $R_2O_3$ is $B_2O_3$, $Al_2O_3$, or a combination thereof.

In another aspect, the invention provides a pavement marking composition comprising a binder and the glass beads of this invention; the beads having a retroreflectivity of at least 700 mcd/m$^2$/lux; wherein the binder is selected from the group consisting of epoxy binders, latex binders, thermoplastic binders, methyl methacrylate binders, polyurea binders, and combinations of any of these.

In a further aspect, the invention provides a method for making glass beads. The method includes:

(a) providing molten particles of a glass having the following composition as stated in weight percent:

$SiO_2$=55–65
$R_2O$=10–20
RO=5–15
$RO_2$=10–25
$R_2O_3$=0–5
Other components=0–2 wherein $R_2O$ is an alkali metal oxide; RO is selected from the group consisting of alkaline earth metal oxides, ZnO, and combinations of these; $RO_2$ is $TiO_2$, $ZrO_2$, or a combination thereof; and $R_2O_3$ is $B_2O_3$, $Al_2O_3$, or a combination thereof;

(b) allowing the particles to spheridize to form beads; and
(c) cooling the beads to solidify them.

The solidified beads have a refractive index of at least 1.59.

DETAILED DESCRIPTION OF THE INVENTION

Glass Beads

Figure 1:
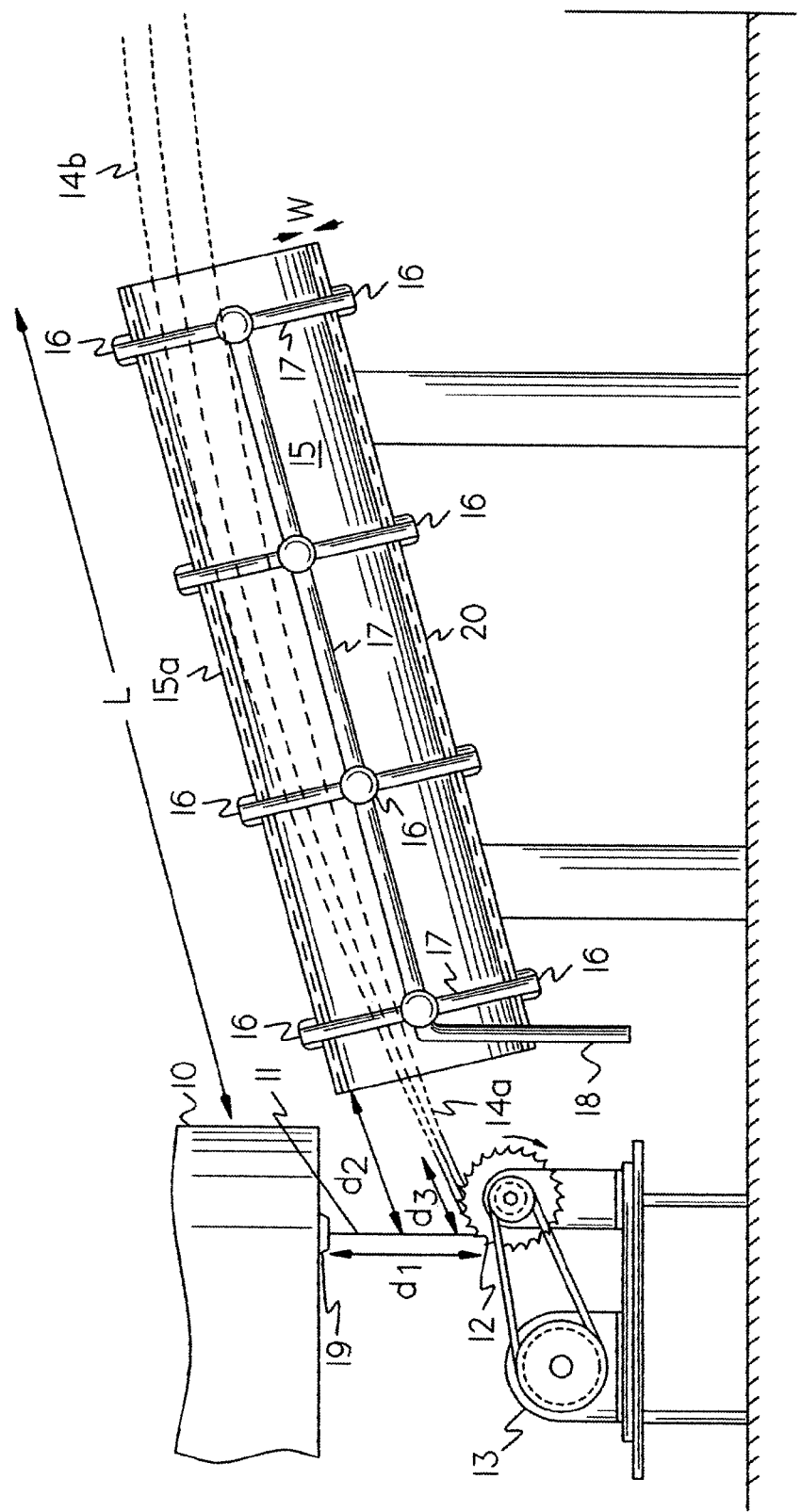
FIG. 1 is a schematic diagram of an apparatus for making glass beads according to the present invention.

Glass beads according to the invention may be used for any purpose, and are especially useful for preparing horizontal pavement markings having high retroreflectivity. The high retroreflectivity is believed to result, at least partially, from the beads being of high refractive index and high optical homogeneity, both of which discourage losses of back-reflected light by internal, absorption and by uncontrolled scattering, which results in loss of light to the sides rather than redirecting it back toward the source.

Beads according to the invention have a high refractive index, which contributes to this high retroreflectivity. In one embodiment of the invention the beads have a refractive index, as measured by the Becke line oil immersion method, of at least 1.59, an preferably between 1.59 and 1.63, which results at least in part from the inclusion of substantial amounts of $TiO_2$, $ZnO$, and/or $ZrO_2$ in the glass.

Also contributing to high retroreflectivity is the high optical homogeneity of the beads, which includes as contributing factors a high level of sphericity and low level of devitrification and gas bubble inclusion, since both devitrification and bubble inclusion generate scattering centers, which reduce retroreflectivity. Typically, devitrification, which refers to the presence of some degree of crystallization, is present in less than 0.1% (i.e. fewer than 1 bead in 1000) on average in beads made according to the invention, as determined by microscopic inspection. The beads are also relatively free of gas bubbles, with typically less than 1% (i.e. fewer than 10 beds in 1000) on average containing optically visible bubbles, as determined by microscopic inspection. Many of the beads of this invention have a sigma-square value less than $1\times10^{-5}$, as determined by the Christiansen Filter test method, well known in the art as a means of gauging optical homogeneity. Details of that method may be found in T. Tenzler and G. H. Frischat, "Application of Christiansen-Shelyubskii Method to determine Homogeneity and refractive Index of Industrial Glasses", Glastech. Ber. Glass Sci. Technol. 68 (12) 1995, or alternatively in G. Schilling and W. Weiss, "Experiments to Determine the Homogeneity of Glasses by the Shelyubskii Method", Glass Technology 7(2) 1966.

Beads according to the invention also provide very little color in the reflected light, indicating that there is little preferential scattering or absorption of any particular visible wavelength, which would not only be visually displeasing but would also indicate a loss of back-reflected light. Generally when pavement marking beads show any color it is yellowish, and thus an indication of yellowness is useful in characterizing beads for this application. Typical beads according to the invention have a yellowness index scale (YI) value less than 30, and more typically less than 20, using ASTM E313-00, "Standard Practice for Calculating Yellowness and Whiteness Indices from Instrumentally Measured Color Coordinates" under D65 illumination using an observation angle of 20.

Typically, beads according to the invention provide a retroreflectivity of at least 700 mcd/m²/lux, and more typically at least 900 mcd/m²/lux, and may be used in formulating pavement markings comprising the beads and a binder chosen from any binder known in the art for pavement marking, including as nonlimiting examples epoxy, latex, thermoplastic, methyl methacrylate, and polyurea binders.

As used herein, the term "retroreflectivity" as applied to the beads of this invention will mean the retroreflectivity obtained from a test sample wherein beads are applied to a binder and evaluated as described in Example 1. Retroreflectivity, (also referred to as coefficient of retroreflection, $R_L$) can be measured using a hand-held instrument such as the Retrometer LTL 2000, available from Delta Light and Optics of Lyngby, Denmark, at 30 meter measurement geometry. Beads according to the invention may be of any size, but for pavement marking they typically have a mean diameter between about 0.05 mm and 2.5 mm, and more typically between 1.0 and 1.2 mm.

The beads of this invention also exhibit good durability under difficult environmental conditions such as are found in pavement marking applications. It will be appreciated that beads used for such applications are subject to degradation by a number of environmental exposure, and thus need to be robust both chemically and physically.

Pavement marking beads are exposed to strong physical forces resulting from the passage of vehicles, snow plows, and the like. Thus beads for use in this application must be resistant to crushing and abrasion. Beads according to the invention typically have an average crush resistance of at least 350 MPa, and more typically at least 400 MPa, as determined by uniaxial compression testing, and are typically very resistant to abrasion. These advantages may be due at least in part to the typically high hardness of the glass compositions used to prepare the beads, which glasses when annealed have an average Vickers hardness value between 500 GPa and 600 GPa.

Pavement marking beads are also exposed to relatively high concentrations of atmospheric pollutants arising from passing vehicles, which exposure tends to cloud the beads, reducing their retroreflectivity. One measure of durability in the face of such pollutants is resistance to reducing smog conditions, as approximated by exposing the beads to a 1-hour treatment at 25° C. in a solution of 50 weight % sodium sulfide, 48 weight % distilled water and 2 weight % of polyoxyethylene (40) isooctylphenyl ether, available commercially as Triton® X-405, a nonionic wetting agent. Clouding of the beads is indicated by an increase in the Hunter L value, and beads according to the invention typically exhibit no more than a 10-unit increase in Hunter L value after such treatment, and often no more than a 5-unit increase.

During storage, the beads may also be exposed to hot and humid conditions such as may be encountered in warehouses. Such conditions tend to cause clouding of most glasses, for example by the formation of sodium carbonate from atmospheric carbon dioxide and sodium ions in the beads. Resistance to such clouding can be indicated by exposing the beads to 90% relative humidity at 37.8° C. for a period of time. Beads according to the invention are quite resistant to clouding due to heat and humidity, and typically exhibit no more than a 10-unit increase in Hunter L value after such treatment, and often no more than a 5-unit increase, after 3 weeks of exposure to such test conditions.

Glass Composition

Glass compositions suitable for making beads according to the invention contain substantial amounts of $SiO_2$ and $TiO_2$, resulting in a high refractive index, which is least 1.59 and typically between 1.59 and 1.63. In general, the glasses fall within the following composition range, as stated in weight percent:

$SiO_2$=55–65
$R_2O$=10–20

RO=5–15
RO$_2$=10–25
R$_2$O$_3$=0–5
Other components=0–2.

As used herein, R$_2$O means one or more alkali metal oxides, RO means one or more alkaline earth metal oxide and/or zinc oxide, RO$_2$ means TiO$_2$ or ZrO$_2$ or a combination thereof, and R$_2$O$_3$ means B$_2$O$_3$, Al$_2$O$_3$, or a combination thereof. The 0–2% of "other components" may include, as nonlimiting examples, GeO$_2$, P$_2$O$_5$, As$_2$O$_3$, TeO$_2$, SeO$_2$, MoO$_3$, WO$_3$, Bl$_2$O$_3$, Ga$_2$O$_3$, and V$_2$O$_5$, and/or other components known in the art. In a preferred embodiment of the invention, the 0–2% includes as much as about 1.5% of Sb$_2$O$_3$, more typically about 0.5%. The presence of Sb$_2$O$_3$ may be helpful in reducing yellowness in the glass. Also in order to reduce yellowness, it is preferred that the glass contain less than 0.03 wt % of iron (Fe), more preferably less than 0.01 wt %.

Typically, the glass compositions of the invention have the following composition as stated in weight percent:
SiO$_2$=55–62
R$_2$O=10–14
RO=5–10
TiO$_2$=15–20
R$_2$O$_3$=0–1
Other components=0–2.

Typically, R$_2$O comprises, or consists essentially of, Na$_2$O in an amount equal to at least 10 wt % of the glass. Typically, RO comprises, or consists essentially of, an alkaline earth metal oxide. RO may comprise CaO in an amount equal to at least 5 wt % of the glass, optionally with other alkaline earth metals and/or zinc oxide also present to bring the total amount of RO above 5 wt %. Typically, RO$_2$ is TiO$_2$. One exemplary glass formulation for making beads according to the invention has a refractive index of about 1.616–1.624, and has the following composition as stated in weight percent:
SiO$_2$=60
R$_2$O=12.5
RO=6
TiO$_2$=20
R$_2$O$_3$=0.5
Other components=1.

Glass formulations suitable for use according to the invention typically have a viscosity of 50–500 poise, and more typically 100–200 poise, in molten form at a temperature above the crystallization temperature of the glass. This combination of properties may be particularly useful in providing beads that are highly spherical (due to the relatively low viscosity, which allows effective spheridization), thereby increasing retroreflectivity, and that have a very little or no devitrification (which hurts retroreflectivity by increasing scattering). In one embodiment of the invention, the temperature at which the glass has a viscosity of 50–500 poise, or of 100–200 poise, is at least 25° C. greater than the crystallization temperature of the glass. This provides a convenient operating margin in a practical manufacturing process, where inhomogeneities in particle size, particle temperature during the spheridizing process, and/or other variables may make a greater operating margin desirable to prevent devitrification of the beads. Typically, glasses suitable for use according to the invention have crystallization temperatures between 1050° C. and 1150° C., as determined by ASTM method C829.

Method of Making the Beads

The invention provides a method for making glass beads, comprising:

(a) providing molten particles of a glass having a composition as defined above;

(b) allowing the particles to spheridize to form beads; and (c) cooling the beads to solidify them.

Various methods may be employed for forming beads having a composition according to the invention. For example, the glass may be provided in already-formed solid particles, such as by grinding a glass having a composition according to the invention, with the particles being carried into a heated zone (which may for example be a flame, or a furnace) where they melt and spheridize to form the beads of this invention. Suitable methods of this sort are known in the art, for example as disclosed in U.S. Pat. No. 2,334,578 to R. H. Potters, which describes introducing glass particles into a flame in a draft tube or stack. Another bead-forming technique uses a rotating wheel to strike a stream of molten glass with sufficient force to cause the stream to break up into particles, which are projected through a heated region and ultimately to a cooling region and a collection zone. Such a system is shown and disclosed in U.S. Pat. No. 3,495,961. Still another method is disclosed in U.S. Pat. No. 3,499,745, which discloses a process similar to the process disclosed in the '961 patent, but utilizes a rotor instead of a strike wheel. Other known methods of making glass beads include impinging a stream of gas onto a stream of molten glass to disperse the glass into discreet particles, such as is disclosed in U.S. Pat. No. 3,279,905.

In one exemplary embodiment, the particles are filaments and step (a) comprises, in sequence, providing a bath of molten glass, forming from the bath a stream of molten glass, and breaking the stream to form the filaments, for example by use of a strike wheel or a flame jet. Such method is described in European patent EP 1,135,343 B1. As used herein, the term "filament" means a single elongated quantity of molten glass of any shape but typically in the shape of a fiber or strand or spheroid after initially breaking up. A description of a process and apparatus suitable for the practice of this embodiment of the invention will now be presented.

A method of forming beads according to the invention will next be illustrated with reference to FIG. 1, which is intended to be illustrative rather than limiting and is included herewith to facilitate the explanation of the invention. FIG. 1 is not to scale, and is not intended to serve as an engineering drawing.

Turning now to the drawing, FIG. 1 is a schematic diagram of an apparatus for producing glass beads. As shown in FIG. 1, a furnace 10 is used to contain and heat glass raw materials, with a first degree of heat, to form a bath of molten glass in a conventional manner. Typically, the first degree of heat supplied to the furnace is sufficient to raise the temperature in the furnace to about 1300–1600° C. The furnace has an orifice 19 to provide a stream 11 of molten glass flowing downward from the bath of molten glass. The stream flows in a laminar, continuous stream and is directed to a strike wheel 12 driven by a motor 13. The strike wheel 12 is a multi-finned rotatable disk. Orifice 19 is adjustable so that stream 11 of molten glass can have a variable stream diameter. Additionally, stream 11 of molten glass travels a drain distance d1 from orifice 19 to strike wheel 12. In an alternative embodiment of this invention, the furnace 10 includes several orifices, each of which provides a stream of molten glass which flows to a strike wheel or has a strike wheel individually associated with each stream. Three separate streams are shown in FIG. 1 as being projected from strike wheel 12, but any number of streams may be used.

The molten glass impinging upon the periphery of strike wheel 12, indicated as revolving clockwise, is redirected by the force of the strike wheel. The force imparted by strike wheel 12 onto stream 11 of molten glass is sufficient to cause the stream to break up after traveling a distance d3 into filaments 14a and to pass through a heated region 15 defined by a heater housing 15a. As is well-known, there is not a single point at which the stream breaks up and instantaneously forms a number of filaments corresponding to the number of beads ultimately formed; instead, the stream undergoes a primary break-up into primary filaments, which, in turn, break up into secondary filaments, which themselves might break up further into tertiary filaments. This process continues to a varying extent, depending on the particular conditions of the system and the composition, viscosity, and surface tension of the molten glass. At some point (typically within about 20% of the travel time of the filaments through a heated region), substantially all of the filaments have separated, so that the number of filaments substantially corresponds to the number of beads ultimately formed. As used herein, this point will be referred to as the "separation completion point." From the separation completion point forward, the volume of each filament remains about the same, and each filament's shape evolves towards the shape of a sphere due to the effects of surface tension.

For purposes of the present invention, it may be useful to determine the time at which the stream breaks up, meaning the median point between the time at which the stream first begins to break up into filaments and the separation completion point. High speed photography can be used to determine this median point precisely, but an approximation of about 10% of the travel time from the strike wheel to the end of the heated region is acceptable for many systems and glass compositions.

According to FIG. 1, the stream and filaments travel a cooling distance d2 after being struck by strike wheel 12 but before entering heated region 15. Although not shown in FIG. 1, a larger heater could substantially encompass strike wheel 12 and its associated apparatus, but merely have openings to allow for the flow of stream 11 and filaments 14a.

Regarding the bead size, although this is a function of many factors, the primary factors are the composition of the glass, the diameter of the orifice where the molten stream emerges, and the number of teeth on the strike wheel. Therefore, as soon as the filaments are formed, the diameter of the formed round beads are essentially fixed based on the three factors mentioned above. If smaller diameter beads are desired, the diameter of the orifice of the furnace is decreased or the number of teeth are increased. The lower limit of the number of teeth is dependent on the desired productivity, while the upper limit is dictated by the need to avoid having the back of a first tooth interfere with the flow path of the stream as it emerges from another tooth adjacent the first tooth.

Suitable exemplary ranges for parameters of the strike wheel embodiment follow. The diameter of the molten glass stream typically ranges from about 0.5 mm to about 3 mm, and in some embodiments it ranges between 1 mm and 2 mm. In one embodiment, a strike wheel which can be used in connection with the present invention has an outer diameter of 135 mm and an 8-mm pitch, with 53 teeth. The speed of the strike wheel is around 3,000 to 8,000 rpm. The preferred range of the speed is between about 6,000 rpm to 7,000 rpm for a 130-mm diameter strike wheel.

Suitable ranges of other parameters, without respect to any particular means of forming the molten glass particles, are as follows. A preferred temperature of the molten glass is that at which the viscosity is between about 50 and 500 poise, more preferably between about 100 and 200 poise, for the reasons noted previously. It is also preferred that this temperature be higher than the crystallization temperature of the glass, preferably at least 25° C. higher as also noted previously, and that the particles be provided to begin the spheridizing process at this temperature or higher. In one embodiment of the invention, the glass meets these viscosity criteria at a temperature between about 1200° C. and 1350° C.

To maintain the viscosity of the particles within the desired limits during the spheridizing process, thereby forming more nearly perfect spheres, the temperature of the atmosphere in which the spheridizing occurs is preferably at least as high as that at which the particles are provided. The exact temperature chosen for the spheridizing atmosphere depends upon a number of variables, including the choice of glass formulation and the desired particle size. It will be appreciated by the person of ordinary skill in the art that a degree of routine optimization of this temperature, in combination with adjustment of temperature of the glass particles as provided (and perhaps other variables as well), may be necessary for any given formulation and desired glass bead size. As a general rule, however, an acceptable temperature for the atmosphere in which spheridizing occurs will generally be in the range of 1200° C. to 1600° C., more typically 1300° C. to 1600° C. Sufficient time should be provided for the molten glass particles to spheridize, typically at least 0.05 seconds. In the case where beads having a mean diameter between 1 and 1.2 mm are to be produced, the temperature of the atmosphere may typically be between about 1450° C. and 1550° C.

Application of the Beads

Beads according to the invention may be incorporated into reflective devices or coatings in any way known in the art. In the case of pavement markings, the beads may for example be dispersed onto a binder material that has been applied to the pavement, so that the beads stick to the surface of the binder and provide a highly retroreflective surface. Exemplary binders are well known in the art, and include polymethyl methacrylate, polyester, polyurethane, polyurea, epoxy, latex, and solvent-based coatings. Alternatively, the beads may be incorporated in the surface of a tape, such that the tape can be applied to a surface (for example, pavement) and thereby provide a highly retroreflective surface. Other ways of incorporating the beads of this invention into useful objects or materials will be apparent to those of ordinary skill in the art.

EXAMPLES

Example 1

The following materials were mixed and fed into a conventional glass melting furnace heated using natural gas-oxygen burners at a feed rate of about 167 kg/hour, where the values are given in kilograms.

Sand: 414

Soda Ash: 188.

Limestone: 131.5

Titanium Dioxide: 149

The glass in the melting tank was kept at a temperature of 1350° C. and was conditioned to a surface temperature of approximately 1200° C., where it was extracted from 5 orifices each having a diameter of 8 mm. The glass streams were dropped onto a strike wheel, turning at 5,000–6,000 rpm and having an outer diameter of 135 mm and 8 mm pitch, with 53 teeth, and accelerated at approximately 20–30° from horizontal. The accelerated streams were allowed to pass through a 3-meter tube that was heated using 2 gas-air burners and the air-cooled beads were collected at the end of their trajectory. The temperature of the atmosphere in the 3-meter tube was approximately 1450° C. to 1550° C. The resulting glass beads had a refractive index of 1.620–1.624 and size distribution between 0.85 to 1.12 mm, with 96% of the beads by weight measured to be spherical as determined by particle count using optical microscopy, counting as "spherical" all particles with an aspect ratio of 1.2 or less. The chemical composition of the beads was measured as follows, where the values are in weight percentages:

$SiO_2$=54.5
$Na_2O$=14.95
$K_2O$=0.25
CaO=9.94
MgO=0.13
$Al_2O_3$=0.51
$Fe_2O_3$=0.037
$TiO_2$=18.43

Beads were uniformly dropped onto a glass plate that had been coated with a white epoxy binder layer (Epoplex LS50, Stonhard Inc. of Maple Shade, N.J.), applied by use of a 25-mil doctor blade. The beads were applied uniformly onto the binder at a loading rate of 600 g/m² to simulate a road stripe, ensuring that each bead was immersed into the binder at no more than 60% and no less than 40% of its diameter. After curing of the epoxy binder, the retroreflectivity of the bead/binder system measured an average of 929 mcd/m²/lux from 8 measurements, using a Retrometer LTL-2000 instrument at 30 meter geometry.

Example 2

Comparative

Glass beads having a refractive index of 1.54 were prepared, using a glass of the following chemical composition, shown in weight percentages:

$SiO_2$=62
$Na_2O$=15
$K_2O$=1
CaO=16.5
MgO=2.6
$Al_2O_3$=2.0

The beads were made according to the process described in Example 1, and evaluated for retroreflectivity as in that example. The retroreflectivity of the cured bead/binder system measured an average of only 603 mcd/m²/lux from 8 measurements.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. Glass beads having a refractive index of at least 1.59 and having the following composition as stated in weight percent:

$SiO_2$=55–65
$R_2O$=10–20
RO=5–15
$RO_2$=10–25
$R_2O_3$=0–5
Other components=0–2
wherein $R_2O$ is one or more alkali metal oxides; RO is selected from the group consisting of alkaline earth metal oxides, ZnO, and combinations of these; $RO_2$ is $TiO_2$, $ZrO_2$, or a combination thereof; $R_2O_3$ is $B_2O_3$, $Al_2O_3$, or a combination thereof; and wherein $R_2O$ comprises $Na_2O$ in an amount equal to at least 10 wt % of the glass.

2. The glass beads of claim 1, wherein RO is selected from the group consisting of alkaline earth metal oxides and combinations of these, and $RO_2$ consists essentially of $TiO_2$.

3. The glass beads of claims 1, wherein the composition is:

$SiO_2$=55–62
$R_2O$=10–14
RO=5–10
$TiO_2$=15–20
$R_2O_3$=0–1
Other components=0–2;
wherein RO is selected from the group consisting of alkaline earth metal oxides and combinations of these and $RO_2$ is $TiO_2$.

4. The glass beads of claim 1, wherein RO comprises CaO in an amount equal to at least 5 wt % of the glass.

5. The glass beads of claim 1, wherein the glass has a crystallization temperature between 1050° C. and 1150° C.

6. The glass beads of claim 1, wherein the glass in molten form has a viscosity of 50–500 poise at a temperature above a crystallization temperature of the glass.

7. The glass beads of claim 1, wherein the glass in molten form has a viscosity of 100–200 poise at a temperature above a crystallization temperature of the glass.

8. The glass beads of claim 7, wherein the temperature at which the viscosity of the glass in molten form is 100–200 poise is at least 25° C. greater than the crystallization temperature of the glass.

9. The glass beads of claim 1, wherein the beads have a refractive index between 1.59 and 1.63.

10. The glass beads of claim 1, wherein devitrification is present in less than 0.1% of the beads on average, as determined by microscopic inspection.

11. The glass beads of claim 1, wherein less than 1% of the beads on average contain optically visible bubbles, as determined by microscopic inspection.

12. The glass beads of claim 1, having a sigma-square value less than $1 \times 10^{-5}$ according to the Christiansen Filter test method.

13. The glass beads of claim 1, having a yellowness index scale (YI) value less than 30.

14. The glass beads of claim 1, wherein the beads exhibit no more than a 5-unit increase in Hunter L value after a 1-hour treatment at 25° C. in a solution of 50 weight % sodium sulfide, 48 weight % distilled water and 2 weight % of polyoxyethylene(40) isooctylphenyl ether.

15. The glass beads of claim 1, wherein the beads exhibit no more than a 5-unit increase in Hunter L value after 3-week storage at 90% relative humidity at 37.8° C.

16. The glass beads of claim 1, having a mean diameter between about 0.05 mm and 2.5 mm.

17. The glass beads of claim 1, wherein the glass has an average Vickers hardness value between 500 GPa and 600 GPa.

18. The glass beads of claim 1, wherein the beads have an average crush resistance of at least 350 MPa, as determined by uniaxial compression testing.

19. A pavement marking composition comprising a binder and glass beads, the beads having a refractive index of at least 1.59 and having the following composition as stated in weight percent:
$SiO_2$=55–65
$R_2O$=10–20
$RO$=5–15
$RO_2$=10–25
$R_2O_3$=0–5
Other components=0–2
wherein $R_2O$ is one or more alkali metal oxide; RO is selected from the group consisting of alkaline earth metal oxides, ZnO, and combinations of these; $RO_2$ is $TiO_2$, $ZrO_2$, or a combination thereof; and $R_2O_3$ is $B_2O_3$, $Al_2O_3$, or a combination thereof; and wherein $R_2O$ comprises $Na_2O$ in an amount equal to at least 10 wt % of the glass; the beads having a retroreflectivity of at least 700 mcd/m$^2$/lux; and wherein the binder is selected from the group consisting of epoxy binders, latex binders, thermoplastic binders, methyl methacrylate binders, polyurea binders, and combinations of any of these.

20. The composition of claim 19, wherein the retroreflectivity is at least 900 mcd/m$^2$/lux.

UNITED STATES PATENT AND TRADEMARK OFFICE
CERTIFICATE OF CORRECTION

PATENT NO. : 7,045,475 B2
APPLICATION NO. : 10/834147
DATED : May 16, 2006
INVENTOR(S) : Senturk et al.

Page 1 of 1

It is certified that error appears in the above-identified patent and that said Letters Patent is hereby corrected as shown below:

On the Title page, at (56), References Cited, under "FOREIGN PATENT DOCUMENTS," insert the following reference:

-- DE     1 596 828     4/1971 --

Signed and Sealed this

Thirtieth Day of January, 2007

JON W. DUDAS
*Director of the United States Patent and Trademark Office*